(12) United States Patent
Tsunoda et al.

(10) Patent No.: US 11,650,019 B2
(45) Date of Patent: May 16, 2023

(54) FLUID DISPERSING DEVICE

(71) Applicant: IHI CORPORATION, Tokyo (JP)

(72) Inventors: Daisuke Tsunoda, Tokyo (JP); Shigeki Sakakura, Tokyo (JP); Nobuyuki Honma, Tokyo (JP); Kohei Tsurugaya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 228 days.

(21) Appl. No.: 16/736,869

(22) Filed: Jan. 8, 2020

(65) Prior Publication Data

US 2020/0141665 A1    May 7, 2020

Related U.S. Application Data

(63) Continuation of application No. PCT/JP2018/025710, filed on Jul. 6, 2018.

(30) Foreign Application Priority Data

Jul. 11, 2017    (JP) ............................ JP2017-135286

(51) Int. Cl.
  *F28F 9/22*    (2006.01)
(52) U.S. Cl.
  CPC ..................... *F28F 9/22* (2013.01)
(58) Field of Classification Search
  CPC ...... F28F 9/22; F28F 9/0278; F28F 2009/222; F28F 9/0265; F28F 9/028; B01D 21/2405
  USPC ...................................................... 165/174
  See application file for complete search history.

(56) References Cited

U.S. PATENT DOCUMENTS

| | | | | |
|---|---|---|---|---|
| 3,623,505 A | * | 11/1971 | Barsness | B01J 8/0278 137/522 |
| 3,630,276 A | * | 12/1971 | Paine | F22B 1/023 165/158 |
| 4,576,222 A | * | 3/1986 | Granata, Jr. | F28F 9/0278 165/134.1 |
| 4,630,776 A | * | 12/1986 | Findling | B01D 21/2405 239/498 |
| 5,107,923 A | | 4/1992 | Sherman et al. | |

(Continued)

FOREIGN PATENT DOCUMENTS

| | | |
|---|---|---|
| CN | 1144713 A | 3/1997 |
| CN | 1159361 A | 9/1997 |

(Continued)

OTHER PUBLICATIONS

European Patent Office, "Extended European Search Report," issued in European Patent Application No. 18 831 550.1, which is a counterpart to U.S. Appl. No. 16/736,869, dated Feb. 22, 2021, 7 pages.

(Continued)

*Primary Examiner* — Tho V Duong
*Assistant Examiner* — Raheena R Malik (57) ABSTRACT

A fluid disperser includes a plate body installed in a channel, having a first wall portion in a middle region of a first surface facing the upstream side, and provided with a plurality of holes allowing a fluid to flow in from the upstream side to the downstream side, and a second wall portion provided on the first surface and having an inner surface intersecting with a line extending from the middle region to a circumferential edge of the first surface.

2 Claims, 6 Drawing Sheets

(56) References Cited

U.S. PATENT DOCUMENTS

| | | | |
|---|---|---|---|
| 5,261,485 A * | 11/1993 | Thornton | C02F 1/22 165/115 |
| 5,415,223 A * | 5/1995 | Reavis | F28F 9/0278 165/159 |
| 5,752,538 A | 5/1998 | Billingham et al. | |
| 5,753,191 A | 5/1998 | Yamamoto et al. | |
| 6,059,026 A * | 5/2000 | Bailly | F25B 39/028 165/158 |
| 6,183,702 B1 | 2/2001 | Nguyen et al. | |
| 6,382,313 B2 * | 5/2002 | Mitsumoto | B01J 19/002 165/158 |
| 6,537,419 B1 | 3/2003 | Kinnard | |
| 9,310,143 B2 * | 4/2016 | Valente | F28D 7/103 |
| 9,466,506 B2 * | 10/2016 | Masuda | H01L 21/31116 |
| 2005/0011972 A1 | 1/2005 | Barthod et al. | |
| 2009/0039573 A1 | 2/2009 | Hauzenberger et al. | |
| 2009/0242178 A1 * | 10/2009 | Al-Anizi | F28D 7/1607 165/134.1 |
| 2013/0112381 A1 | 5/2013 | Valente | |

FOREIGN PATENT DOCUMENTS

| | | |
|---|---|---|
| CN | 1186873 A | 7/1998 |
| CN | 1295495 A | 5/2001 |
| CN | 2463043 Y | 12/2001 |
| CN | 203683108 U | 7/2014 |
| CN | 203899577 U | 10/2014 |
| CN | 205860304 U | 1/2017 |
| CN | 106606998 A | 5/2017 |
| EP | 1 767 268 A1 | 3/2007 |
| EP | 2 037 175 A2 | 3/2009 |
| EP | 2 407 224 A1 | 1/2012 |
| JP | S51-137763 U | 11/1976 |
| JP | H08-334291 A | 12/1996 |
| JP | 2000-283538 A | 10/2000 |
| JP | 3252165 B2 | 1/2002 |
| JP | 2002-057146 A | 2/2002 |
| JP | 2002-095963 A | 4/2002 |
| JP | 2002095963 A * | 4/2002 |
| JP | 2007-090160 A | 4/2007 |
| JP | 2007-170271 A | 7/2007 |
| JP | 2009-520584 A | 5/2009 |
| JP | 4798655 B2 | 10/2011 |
| JP | 2013-154310 A | 8/2013 |
| JP | 2016-199790 A | 12/2016 |

OTHER PUBLICATIONS

R. N. Maiti and K. D. P. Nigam, "Gas-Liquid Distributors for Trickle-Bed Reactors: A Review," Industrial & Engineering Chemistry Research, vol. 46, pp. 6164-6182, 2007, ACS Publications.

Wu Qiu-hua, "Numerical Simulation of Effect of Disc Plate's Openings on Shell Side Properties of Coiled Heat Exchanger with Convergent-Divergent Tubes," Chemical Machinery, vol. 40, No. 3, pp. 379-382, 399.

China National Intellectual Property Administration, "First Office Action," issued in Chinese Patent Application No. 201880045520.0, which is a counterpart to U.S. Appl. No. 16/736,869, dated Jun. 30, 2021, 9 pages.

* cited by examiner

FLUID DISPERSING DEVICE

CROSS REFERENCE TO RELATED APPLICATIONS

This application is a continuation application of International Application No. PCT/JP2018/025710, filed on Jul. 6, 2018, which claims priority to Japanese Patent Application No. 2017-135286, filed on Jul. 11, 2017, the entire contents of which are incorporated by reference herein.

BACKGROUND

1. Technical Field

The present disclosure relates to a fluid disperser and a fluid dispersing device using the fluid disperser.

2. Description of the Related Art

Heat treatment devices such as a reactor and a heat exchanger, and pressure vessels typically use a dispersing plate for dispersing an introduced fluid into a plurality of channels located on the downstream side. Japanese Unexamined Patent Application Publication No. 2007-170271 (Patent Literature 1) discloses a heat exchanger including a plurality of perforated plates for dispersing introduced recirculated exhaust gas to a plurality of heat transfer pipes provided on the downstream side.

SUMMARY

When the fluid hits against the perforated plate from the front as disclosed in Japanese Unexamined Patent Application Publication No. 2007-170271, most of the fluid tends to flow along the surface of the perforated plate without directly passing through the holes in the perforated plate. The fluid flowing along the surface of the perforated plate concentrates around the circumferential edge of the perforated plate adjacent to the inner wall of a container housing the perforated plate, so as to increase the pressure. The increase in the pressure causes the fluid to flow to the downstream side through the holes adjacent to the circumferential edge of the perforated plate, or a gap between the circumferential edge of the perforated plate and the inner wall of the container. The perforated plate thus has a problem with the balance of dispersion since flow velocity distribution actually concentrates at the circumferential edge of the perforated plate more than the other parts.

An object of the present disclosure is to provide a fluid disperser and a fluid dispersing device contributing to an improvement in dispersion performance of a fluid.

A fluid disperser according to the present disclosure includes: a plate body installed in a channel, having a first wall portion in a middle region of a first surface facing an upstream side, and provided with a plurality of holes allowing a fluid to flow in from an upstream side to a downstream side; and a second wall portion provided on the first surface and having an inner surface intersecting with a line extending from the middle region to a circumferential edge of the first surface.

A fluid dispersing device according to the present disclosure includes: a tubular-shaped portion having an inner curved surface with a channel having a greater diameter on a downstream side than on an upstream side; an opening portion provided in the tubular-shaped portion and allowing a fluid to flow into the channel; and the fluid disperser described above installed in the channel, wherein the first wall portion of the fluid disperser is opposed to an opening of the opening portion, and the second wall portion of the fluid disperser protrudes toward the inner curved surface.

BRIEF DESCRIPTION OF THE DRAWINGS

FIG. 3A is a plan view showing the fluid disperser according to the embodiment of the present disclosure, as viewed from the side provided with a first surface 12a.

DESCRIPTION OF THE EMBODIMENTS

Hereinafter, exemplary embodiments of the present disclosure will be described with reference to the accompanying drawings. The following dimensions, materials, and specific numerical values described in the embodiments are shown for illustration purposes, and the present disclosure is not intended to be limited thereto unless otherwise specified. The elements having substantially the same functions and structures are designated by the same reference numerals, and overlapping explanations are not repeated below. The elements described below but not related directly to the present disclosure are not shown in the drawings. In the following explanations of the drawings, a plane parallel to a surface of a plate body provided with a plurality of holes is defined as an X-Y plane, and a direction perpendicular to the X-Y plane in which the holes penetrate is defined as a Z direction.

Figure 1:
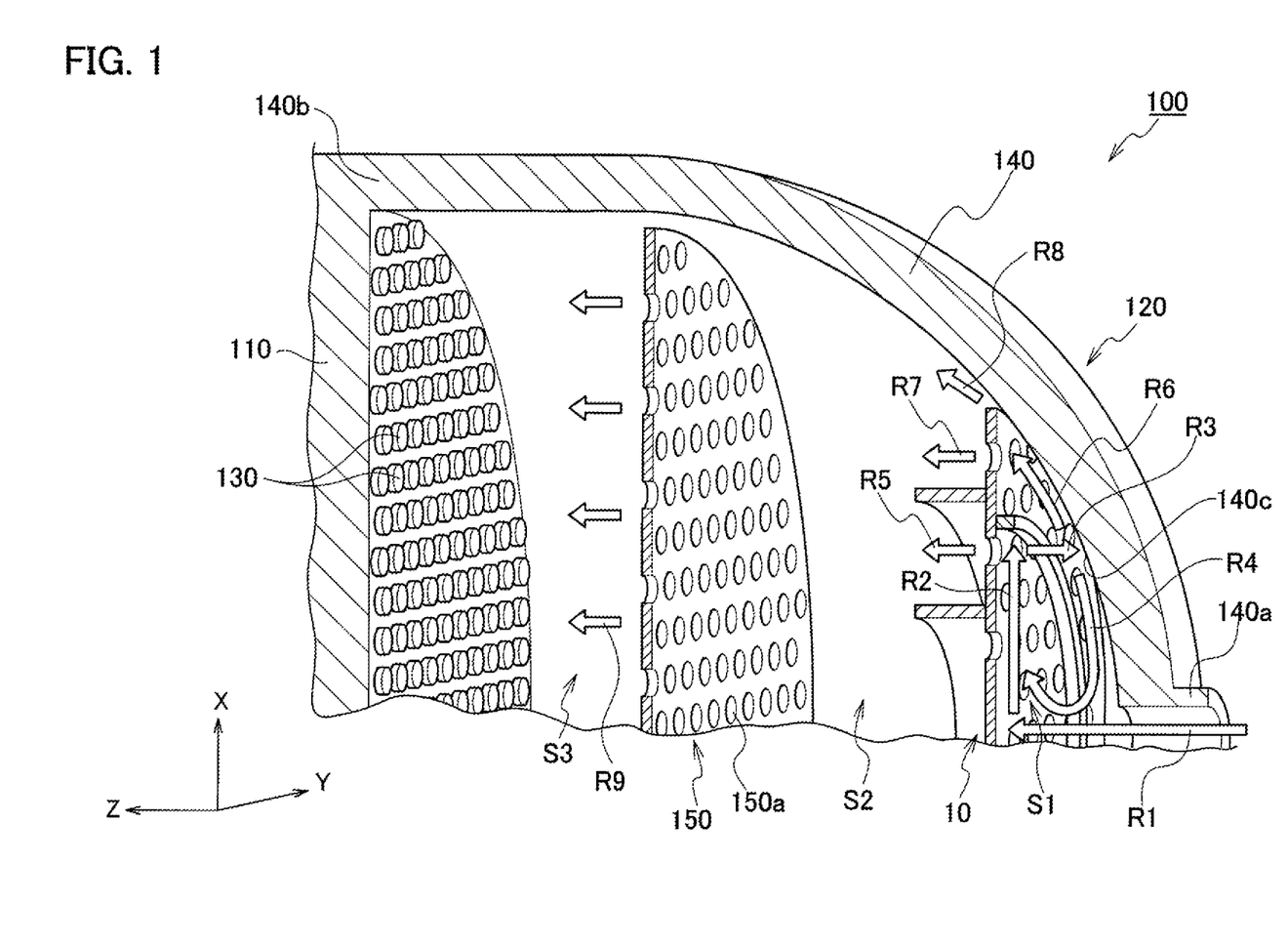
FIG. 1 is a view showing a configuration of a fluid dispersing device according to an embodiment of the present disclosure.

FIG. 1 is a partial perspective view showing a configuration of a fluid dispersing device according to an embodiment of the present disclosure. The fluid dispersing device according to the present disclosure is used for a heat treatment device such as a reactor and a heat exchanger, or a pressure vessel. The fluid dispersing device according to the present disclosure disperses an introduced fluid to a plurality of channels provided on the downstream side. The fluid dispersing device according to the present embodiment is illustrated with a case presumed to be installed in a reactor. As used herein, the term "reactor" refers to a device which uses heat exchange between a reaction fluid and a heat medium, and heats and cools the reaction fluid in a gas or liquid state containing a reaction raw material as a reactant to promote a reaction of the reactant, so as to produce a desirable product.

The reactor 100 includes a heat exchange unit 110 as a main unit, and a fluid dispersing device 120 as a fluid introduction unit for introducing a fluid to the heat exchange unit 110. The fluid introduced to the fluid dispersing device 120 may be either a reaction fluid or a heat medium, and is presumed to be herein a reaction fluid.

The heat exchange unit 110 produces a product from raw material gas contained in the reaction fluid. The heat exchange unit 110 includes a plurality of first heat transfer bodies and a plurality of second heat transfer bodies. The first heat transfer bodies and the second heat transfer bodies are each a plate-like member formed of a heat transfer material having high thermal resistance. The first heat transfer bodies and the second heat transfer bodies are alternately stacked on one another so as to entirely compose the heat exchange unit 110 having a cuboidal shape.

The first heat transfer bodies include a plurality of first channels aligned in the Y direction in rows. The first channels are in-pipe channels serving as reaction channels in which the reaction fluid introduced through the fluid dispersing device 120 flows. The openings 130 on the inlet side of the first channels correspond to the openings at the tips of the pipes facing a third space S3 on the fluid dispersing device 120 side. The openings on the outlet side of the first channels (not shown) are provided at different positions in the heat exchange unit 110, and allow the produced product, for example, to be discharged to the outside.

The second heat transfer bodies include a plurality of second channels aligned in the Y direction. The second channels are in-pipe channels serving as heat medium channels in which the heat medium flows through. The openings on the inlet side of the second channels (not shown) are provided to face the fluid dispersing device 120 on the opposite side in the Z direction, so as to introduce the heat medium through a heat medium introduction unit having a shape similar to a tubular-shaped portion 140 of the fluid dispersing device 120. The openings on the outlet side of the second channels (not shown) are provided at different positions in the heat exchange unit 110, and allow the heat medium having passed through the second channels to be discharged to the outside.

The heat exchange unit 110 has a counter flow-type structure in which the reaction fluid in the first channels and the heat medium in the second channels flow in directions opposite to each other. The first channels cause received heat, supplied from the heat medium flowing through the second channels, to heat the raw material gas so as to produce a product.

The fluid dispersing device 120 includes the tubular-shaped portion 140, and a fluid disperser 10 according to the embodiment of the present disclosure and a perforated plate 150 installed in the tubular-shaped portion 140.

The tubular-shaped portion 140 has two openings opposed to each other in the Z direction, and has an internal space serving as a channel for the reaction fluid. One of the openings serves as a first opening portion 140a from which the reaction fluid is introduced, and the other opening serves as a second opening portion 140b from which the reaction fluid is led out toward the heat exchange unit 110. FIG. 1 illustrates the second opening portion 140b integrated with the heat exchange unit 110. The tubular-shaped portion 140 has a circular shape in cross section along the X-Y plane perpendicular to an axis which is presumed to be a central axis along the Z direction. A channel diameter, which is an inner diameter of the tubular-shaped portion 140, gradually increases from the upstream side to the downstream side. The channel diameter at the first opening portion 140a is smallest, and the channel diameter at the second opening portion 140b is greatest. Namely, the tubular-shaped portion 140 has an inner curved surface 140c having a greater channel diameter on the downstream side than on the upstream side.

The first opening portion 140a is connected to a reaction fluid supply unit provided outside the reactor 100 via a supply pipe (not shown). An inner diameter of the first opening portion 140a is thus set to be substantially the same as a pipe diameter of the supply pipe. The second opening portion 140b has an inner diameter sufficient to entirely cover the side surface of the heat exchange unit 110 provided with a plurality of openings 130. The tubular-shaped portion 140 is thus provided with a closed inner space facing the side surface of the heat exchange unit 110 on the reaction fluid introduction side.

The tubular-shaped portion 140 is detachable or openable with respect to the heat exchange unit 110. The detachable or openable tubular-shaped portion 140 allows the fluid disperser 10 and the perforated plate 150 to be installed in the inner space. The heat exchange unit 110 can be additionally provided with a catalyst body contributing to the reaction inside the respective first channels. The detachable or openable tubular-shaped portion 140 also allows an operator to insert or remove the catalyst body into or from the first channels.

Figure 2A:
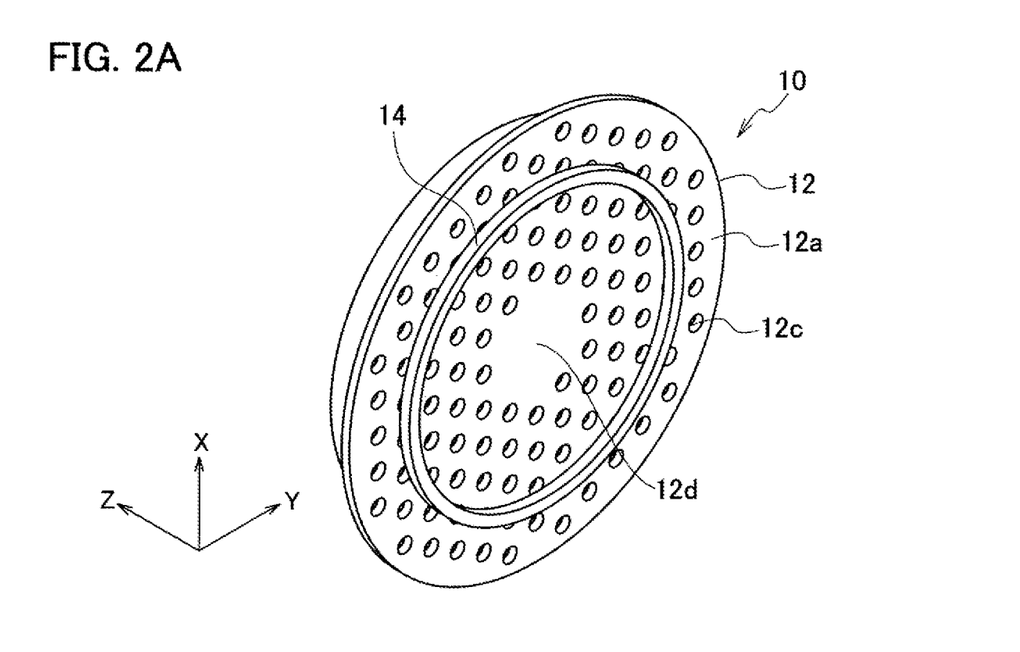
FIG. 2A is a perspective view showing a fluid disperser according to the embodiment of the present disclosure, as viewed from the side on which a reaction fluid hits.
Figure 2B:
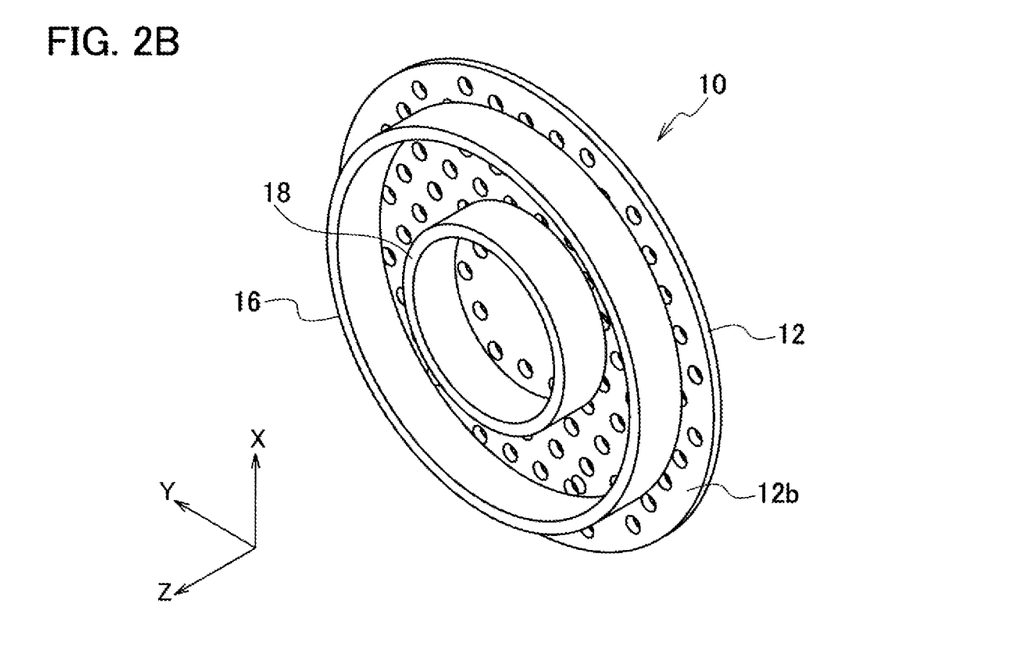
FIG. 2B is a perspective view showing the fluid disperser according to the embodiment of the present disclosure, as viewed from the side on which the reaction fluid is led out.

FIG. 2A is a perspective view showing the fluid disperser 10 as viewed from the side on which the reaction fluid hits. FIG. 2B is a perspective view showing the fluid disperser 10 as viewed from the side on which the reaction fluid is led out.

The fluid disperser 10 includes a disk-like plate body 12. The plate body 12 has front and rear main surfaces having a round shape. The surface of the plate body 12 on the side on which the reaction fluid hits, which is the main surface facing the upstream side when installed in the channel of the tubular-shaped portion 140, is herein defined as a first surface 12a. The surface of the plate body 12 on the side in which the reaction fluid is led out, which is the main surface facing the downstream side when installed in the channel of the tubular-shaped portion 140, is herein defined as a second surface 12b. The plate body 12 is provided with a plurality of holes 12c penetrating the first surface 12a and the second surface 12b so as to allow the reaction fluid to flow in from the upstream side to the downstream side. The holes 12c are formed not entirely on the entire main plane surface of the plate body 12, particularly not provided in the middle region of the main plane surface. The middle region of the plate body 12 not provided with the holes 12c is herein defined as a first wall portion 12d.

The fluid disperser 10 includes a second wall portion 14 provided on the first surface 12a. The second wall portion 14 according to the present embodiment is a hoop-shaped member provided about the middle region serving as a reference of a center. The second wall portion 14 is prepared independently of the plate body 12, and can be fixed to the plate body 12 by welding or bonding. Alternatively, the plate body 12 and the second wall portion 14 may be preliminarily and integrally prepared. The conditions for defining the second wall portion 14 are described in detail below.

The fluid disperser 10 further includes a third wall portion 16 and a fourth wall portion 18 provided on the second surface 12b. The third wall portion 16 and the fourth wall portion 18 according to the present embodiment are each a hoop-shaped member provided about the middle region serving as a reference of a center. An inner diameter of the third wall portion 16 is greater than an outer diameter of the fourth wall portion 18. The third wall portion 16 and the fourth wall portion 18 are both prepared independently of the plate body 12, and can be fixed to the plate body 12 by welding or bonding. Alternatively, the plate body 12 and the third and fourth wall portions 16 and 18 may be preliminarily and integrally prepared. The conditions for defining the third wall portion 16 and the fourth wall portion 18 are described in detail below.

Figure 3A:
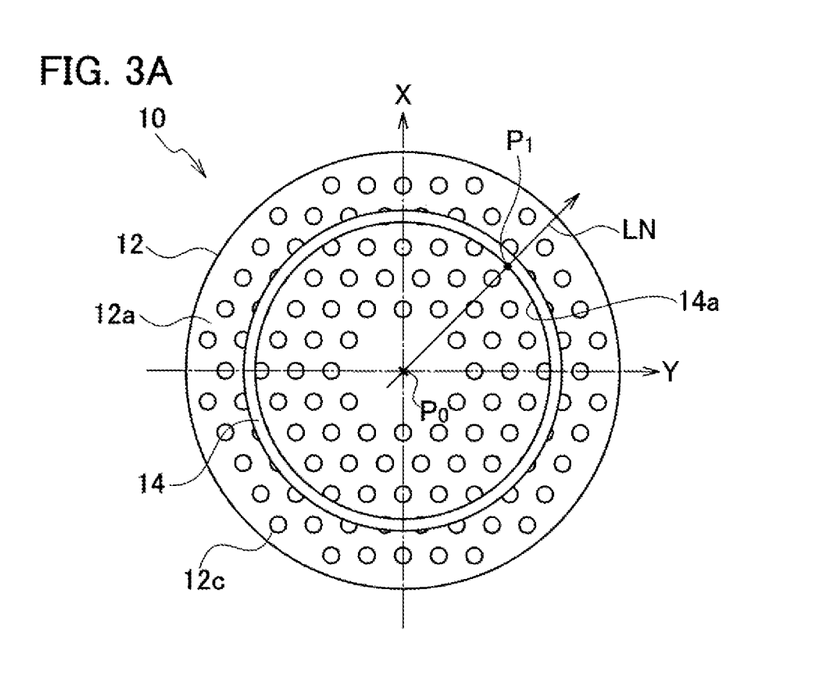
Figure 3B:
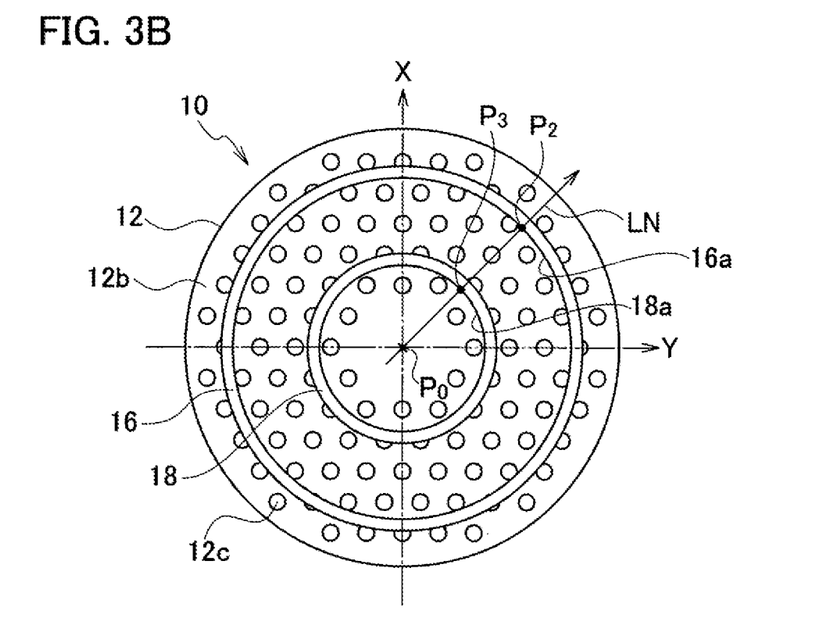
FIG. 3B is a plan view showing the fluid disperser according to the embodiment of the present disclosure, as viewed from the side provided with a second surface 12b.

FIG. 3A is a plan view showing the fluid disperser 10 as viewed from the side provided with the first surface 12a. FIG. 3B is a plan view showing the fluid disperser 10 as viewed from the side provided with the second surface 12b.

As shown in FIG. 3A, the second wall portion 14 has an inner surface 14a intersecting with a line LN extending from the middle region to the circumferential edge of the first surface 12a. The middle region used herein is defined as a centroid $P_0$. The line LN radially extending from the centroid $P_0$ to the circumferential edge needs to hit at any point along the second wall portion 14. Since the second wall portion 14 according to the present embodiment has a hoop shape in cross section taken along the X-Y plane, the line LN necessarily hits to intersect with the inner surface 14a of the second wall portion 14 at the intersection point $P_1$ regardless of which direction the line LN extends from the centroid $P_0$ within the X-Y plane.

As shown in FIG. 3B, the third wall portion 16 and the fourth wall portion 18 also preferably meet the conditions similar to the above conditions regarding the second wall portion 14. In particular, the third wall portion 16 has an inner surface 16a intersecting with the line LN extending from the middle region to the circumferential edge of the plate body 12 at the intersection point $P_2$. Similarly, the fourth wall portion 18 has an inner surface 18a intersecting with the line LN extending from the middle region to the circumferential edge of the plate body 12 at the intersection point $P_3$.

Figure 4:
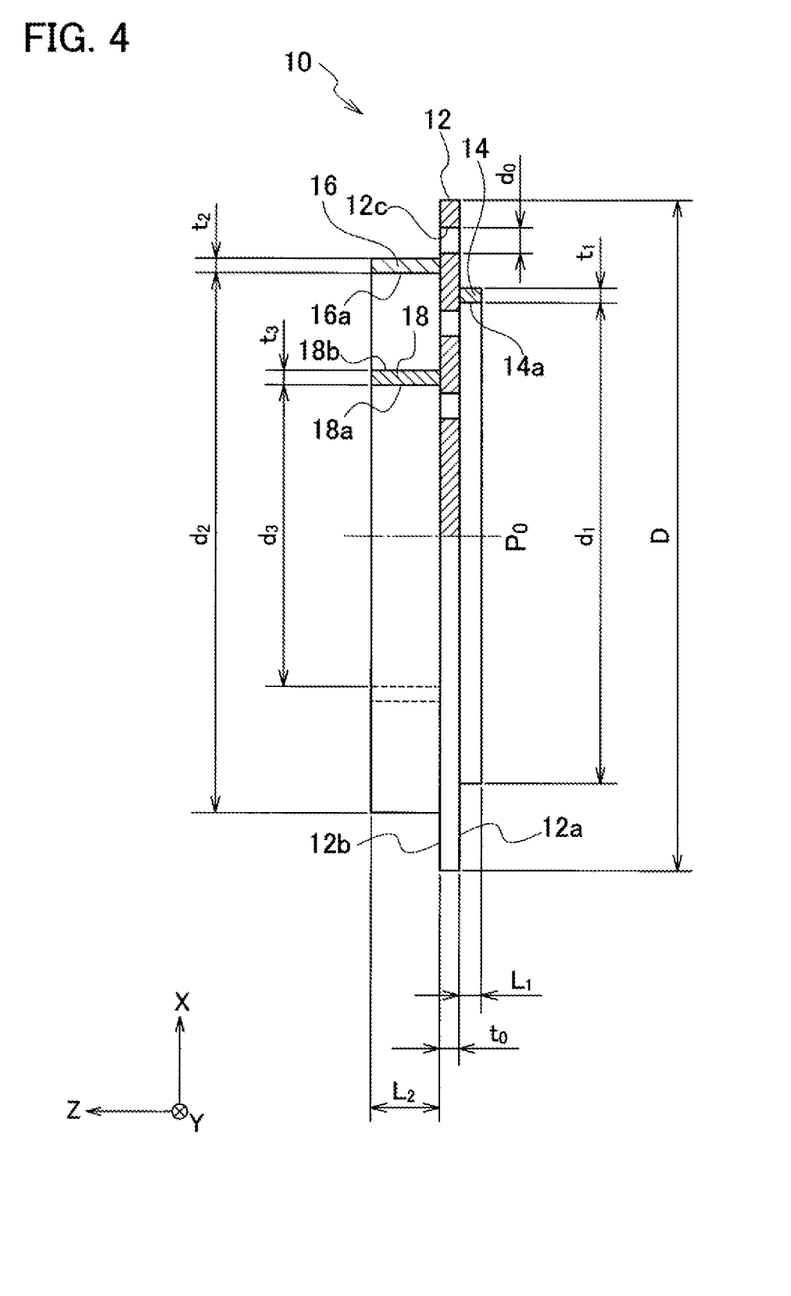
FIG. 4 is a diagram for explaining dimensional conditions of the fluid disperser according to the embodiment of the present disclosure.

FIG. 4 is a cross-sectional side view for explaining the dimensional conditions for the fluid disperser 10. The plate body 12 has an outer diameter D and a thickness $t_0$. The holes 12c provided in the plate body 12 have an opening diameter $d_0$. The second wall portion 14 has a thickness $t_1$, an inner diameter $d_1$, and a height $L_1$ from the first surface 12a. The third wall portion 16 has a thickness $t_2$, an inner diameter $d_2$, and a height $L_2$ from the second surface 12b. The fourth wall portion 18 has a thickness $t_3$, an inner diameter $d_3$, and the same height $L_2$ from the second surface 12b as the third wall portion 16. The thicknesses $t_1$, $t_2$, and $t_3$ of the respective walls are preferably, but not necessarily, smaller than the opening diameter $d_0$ of the holes 12c so as not to increase the number of the holes 12c blocked by these walls. The respective conditions for the fluid disperser 10 as defined above are described in more detail below together with the operations of the fluid disperser 10 and the fluid dispersing device 120.

The perforated plate 150 is a fluid dispersing plate provided with a plurality of holes 150a so as to allow the reaction fluid to flow in from the upstream side to the downstream side. As illustrated in FIG. 1, the perforated plate 150 is arranged parallel to the plate body 12 of the fluid disperser 10 on the downstream side of the fluid disperser 10 in the channel of the tubular-shaped portion 140. An outer diameter of the perforated plate 150, which varies depending on the position to be located, can be equivalent to the inner diameter of the tubular-shaped portion 140 without being in direct contact with the tubular-shaped portion 140. A thickness of the perforated plate 150 can be equivalent to the thickness $t_0$ of the plate body 12 of the fluid disperser 10. An opening diameter of the holes 150a provided in the perforated plate 150 can be equivalent to the opening diameter of the holes 12c provided in the plate body 12 of the fluid disperser 10.

The channel of the tubular-shaped portion 140 is provided with three spaces defined by the fluid disperser 10 and the perforated plate 150. In particular, a first space S1 is defined between the first opening portion 140a and the fluid disperser 10, a second space S2 is defined between the fluid disperser 10 and the perforated plate 150, and a third space S3 is defined between the perforated plate 150 and the second opening portion 140b.

The operations according to the present embodiment are described below with reference to FIG. 1. FIG. 1 indicates the reaction fluid R and flowing directions by the solid-white arrows.

The fluid disperser 10 is preliminarily installed in the channel of the tubular-shaped portion 140 such that the first wall portion 12d in the middle region of the plate body 12 is opposed to the opening of the first opening portion 140a. The outer diameter D of the plate body 12 is preliminarily set to be equivalent to the inner diameter of the tubular-shaped portion 140 without being in direct contact with the tubular-shaped portion 140. In other words, a gap is actually present between the circumferential edge of the plate body 12 and the inner surface of the tubular-shaped portion 140 adjacent to the circumferential edge.

The reaction fluid R1 supplied from the external reaction fluid supply unit flows through the first opening portion 140a into the first space S1 in the tubular-shaped portion 140. The flowing reaction fluid R1 hits against the first wall portion 12d of the fluid disperser 10. The reaction fluid R2 after hitting flows radially along the first surface 12a, since the first wall portion 12d is provided with no holes 12c.

According to the present embodiment, the second wall portion 14 is provided on the first surface 12a. When the fluid disperser 10 is installed particularly at a position close to the first opening portion 140a, the second wall portion 14 protrudes from the first surface 12a toward the inner curved surface 140c of the tubular-shaped portion 140. The inner curved surface 140c is present on the extension of the inner surface 14a of the second wall portion 14 in the Z direction perpendicular to the first surface 12a. The reaction fluid R2 flowing radially along the first surface 12a thus hits against the inner surface 14a of the second wall portion 14. The reaction fluid R3 hitting against the inner surface 14a changes the flowing direction so as to flow toward the inner curved surface 140c. The reaction fluid hitting against the inner curved surface 140c is divided into two directions.

First, part of the reaction fluid hitting against the inner curved surface 140c, which is indicated as the reaction fluid R4, is caused to make a flow of recirculation inside the second wall portion 14 to return to the first wall portion 12d and again flow along the first surface 12a toward the second wall portion 14. When a pressure inside the second wall portion 14 increases, some of the flow of recirculation, which is indicated as the reaction fluid R5, then passes through the holes 12c in the plate body 12 present inside the second wall portion 14 to further flow into the second space S2.

Second, the rest of the reaction fluid hitting against the inner curved surface 140c, which is indicated as the reaction fluid R6, flows toward the circumferential edge of the plate body 12 along the inner curved surface 140c. When a pressure adjacent to the circumferential edge increases, some of the reaction fluid R6, which is indicated as the reaction fluid R7, passes through the holes 12c in the plate body 12 present outside the second wall portion 14 to further flow into the second space S2. The rest of the reaction fluid R6, which is indicated as the reaction fluid R8, passes through the gap between the circumferential edge of the plate body 12 and the inner surface of the tubular-shaped portion 140 adjacent to the circumferential edge to further flow into the second space S2.

As described above, the reaction fluid flowing through the fluid disperser 10 is divided into the reaction fluid such as the reaction fluid R5 dispersed around the middle region of the plate body 12, and the reaction fluid such as the reaction fluid R7 dispersed around the circumferential edge of the plate body 12. The fluid disperser 10 thus can allow the reaction fluid to flow therethrough so as to be led out of substantially the entire region of the second surface 12b while avoiding local dispersion of the reaction fluid to be led out through a particular region, improving the dispersion performance accordingly.

The reaction fluid R5, R7, or R8 flowing into the second space S2 further flows substantially straight toward the perforated plate 150, and passes through the holes 150a provided in the perforated plate 150. The reaction fluid R9 passing through the holes 150a is regulated by the perforated plate 150 to lead to a substantially uniform flow velocity distribution on the entire surface of the perforated plate 150, so as to keep the balance of distribution of the reaction fluid toward the respective openings 130 provided in the heat exchange unit 110.

Figure 6:
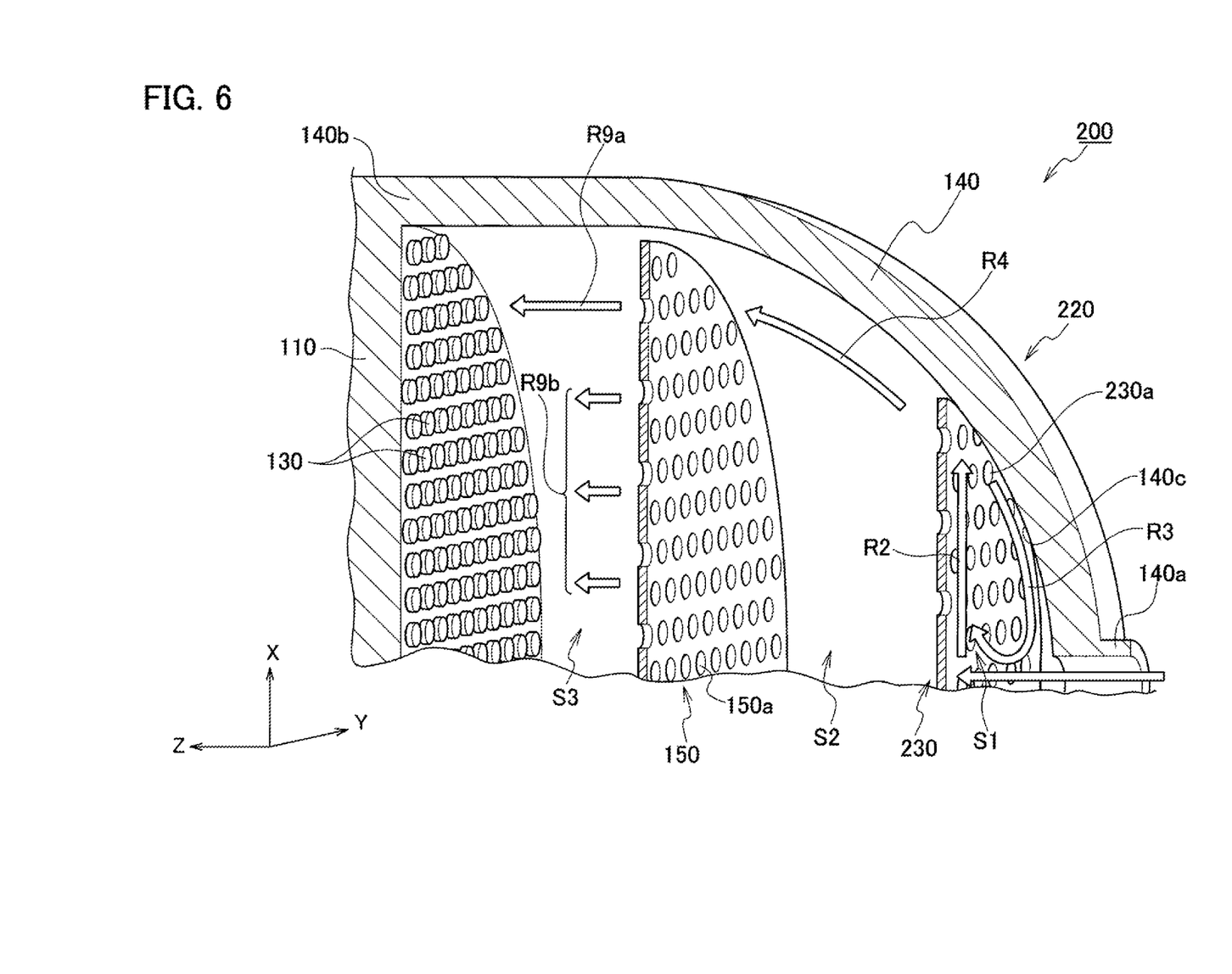
FIG. 6 is a view showing a configuration of a fluid dispersing device of a comparative example.

A comparative example is illustrated below with a flow of a reaction fluid R in a case of not including the fluid disperser 10 according to the present embodiment. FIG. 6 is a partial perspective view showing a configuration of a fluid dispersing device 220 of the comparative example. FIG. 6 illustrates the configuration corresponding to FIG. 1, and also indicates the reaction fluid R and flowing directions by the solid-white arrows.

The fluid dispersing device 220 is used for a reactor 200, as in the case of the present embodiment. The fluid dispersing device 220 differs from the fluid dispersing device 120 according to the present embodiment in including, instead of the fluid disperser 10, a simple perforated plate 230 provided with a plurality of holes 230a. The perforated plate 230 is equivalent in structure to the plate body 12 included in the fluid disperser 10 for the purpose of easy comparison.

The reaction fluid R1 supplied from the external reaction fluid supply unit hits against the surface of the perforated plate 230 and then flows radially along the surface, which is similar to the case described in the above embodiment.

The perforated plate 230 does not include the second wall portion 14 according to the present embodiment. The reaction fluid R2 thus flows along the surface toward the circumferential edge of the perforated plate 230. The reaction fluid R2 reaching the circumferential edge is then divided into two directions.

First, part of the reaction fluid R2 reaching the circumferential edge, which is indicated as the reaction fluid R3, is caused to make a flow of recirculation to return to the first opening portion 140a along the inner curved surface 140c of the tubular-shaped portion 140, and again flow along the surface of the perforated plate 230 toward the circumferential edge. The flow of recirculation then joins the reaction fluid R2.

Second, the rest of the reaction fluid R2 reaching the circumferential edge, which is indicated as the reaction fluid R4, passes through the holes 230a present adjacent to the circumferential edge upon an increase in pressure, and also passes through the gap between the circumferential edge and the inner surface of the tubular-shaped portion 140 adjacent to the circumferential edge to further flow into the second space S2.

As described above, most of the reaction fluid flowing through the perforated plate 230, as illustrated with the reaction fluid R4, is dispersed around the circumferential edge of the perforated plate 230. Namely, the reaction fluid flowing through the perforated plate 230 is led out only of a particular region on the rear surface of the perforated plate 230 corresponding to the second surface 12b of the plate body 12.

The reaction fluid R4 flowing into the second space S2 further flows substantially straight toward the perforated plate 150. This increases the flow velocity more for the reaction fluid R9a having passed through the holes 150a present at the circumferential edge of the perforated plate 150 than for the reaction fluid R9b having passed through the holes 150a present in a wider region including the middle region of the perforated plate 150, regardless of whether the reaction fluid R9 is regulated by the perforated plate 150. The unevenness of the flow velocity distribution is thus caused along the surface of the perforated plate 150, failing to keep the balance of distribution of the reaction fluid toward the respective openings 130 provided in the heat exchange unit 110.

Next, the advantageous effects according to the present embodiment are described below.

The fluid disperser 10 includes the plate body 12 which is installed in the channel, has the first wall portion 12d in the middle region of the first surface 12a facing the upstream side, and is provided with the plural holes 12c allowing the fluid to flow in from the upstream side to the downstream side. The fluid disperser 10 further includes the second wall portion 14 which is provided on the first surface 12a and has the inner surface 14a intersecting with the line LN extending from the middle region to the circumferential edge of the first surface 12a.

The fluid introduced toward the first wall portion 12d radially flows along the first surface 12a, and then hits against the inner surface 14a of the second wall portion 14. The fluid disperser 10 can divide the flowing fluid into the fluid passing through the holes 12c located inside the second wall portion 14 and the fluid passing through the holes 12c located outside the second wall portion 14. If the plate body 12 is not provided with the second wall portion 14, as described in the comparative example, most of the fluid would be dispersed mainly from the circumferential edge of the plate body 12, which has a problem of failing to keep the balance of distribution of the reaction fluid from the entire surface of the plate body 12. The fluid disperser 10 according to the present embodiment thus can improve the dispersion performance of the fluid.

The second wall portion 14 included in the fluid disperser 10 according to the present embodiment has a hoop shape in cross section, which is parallel to the first surface 12a, located about the middle region serving as a reference of a center.

One of the effects of the fluid disperser 10 according to the present embodiment is to enable the fluid flowing along the first surface 12a after hitting against the first wall portion 12d to further hit against the inner surface 14a due to the hoop shape of the second wall portion 14 in cross section. Another effect is to allow the fluid hitting against the first wall portion 12d and radially flowing along the first surface 12a to hit against the inner surface 14a of the second wall portion 14 at substantially the same timing in any radial direction, since the base of the second wall portion 14 when installed is set to conform to the middle region of the first surface 12a. This enables the fluid dispersed by the fluid disperser 10 to equivalently flow in all radial directions, so as to improve the balance of dispersion of the fluid. Still another effect is to facilitate the manufacture of the second wall portion 14 due to the hoop shape in cross section.

The second wall portion 14 included in the fluid disperser 10 according to the present embodiment has the height $L_1$, which is smaller than the opening diameter $d_0$ of the respective holes 12c provided in the plate body 12.

The fluid disperser 10 according to the present embodiment, first, can change the flowing direction of the fluid flowing along the first surface 12a after hitting against the first wall portion 12d by the inner surface 14a of the second wall portion 14. Second, setting the height $L_1$ of the second wall portion 14 to be smaller than the opening diameter $d_0$ of the holes 12c can avoid obstructing the flow of the fluid, which is to climb over the second wall portion 14 later to flow out of the second wall portion 14. The height $L_1$ of the second wall portion 14 is preferably set to be greater than (0.4×the opening diameter $d_0$) and smaller than the opening diameter $d_0$ in order to achieve these effects more effectively.

The fluid disperser 10 according to the present embodiment further includes the third wall portion 16 having the inner surface 16a provided on the second surface 12b of the plate body 12 on the opposite side of the first surface 12a and intersecting with the line LN extending from the middle region to the circumferential edge of the second surface 12b.

The third wall portion 16 included in the fluid disperser 10 according to the present embodiment can avoid the flow of recirculation of the fluid having passed through the holes 12c to be led out of the second surface 12b, so as to regulate the fluid to flow in a designed direction toward the downstream side.

The third wall portion 16 included in the fluid disperser 10 according to the present embodiment has the height $L_2$ which is greater than the height $L_1$ of the second wall portion 14.

The third wall portion 16 included in the fluid disperser 10 according to the present embodiment enables both the prevention of recirculation of the fluid having passed through the holes 12c to be led out of the second surface 12b, and the regulation of flow of the fluid more precisely. The height $L_2$ of the third wall portion 16 is preferably set to be greater than (3×the opening diameter $d_0$) of the holes 12c and smaller than (5×the opening diameter $d_0$) in order to achieve these effects more effectively. The above conditions regarding the heights are also applied to the fourth wall portion 18. While FIG. 4 illustrates the case in which the third wall portion 16 and the fourth wall portion 18 have the same height $L_2$, the respective heights may be different from each other.

The third wall portion 16 included in the fluid disperser 10 according to the present embodiment has the inner diameter $d_2$, which is the same as or greater than the inner diameter $d_1$ of the second wall portion 14.

The third wall portion 16 included in the fluid disperser 10 according to the present embodiment enables the regulation of the flow of the fluid having passed through the holes 12c particularly inside the second wall portion 14, so as to improve the efficiency of regulation of the flow in the entire fluid disperser 10.

The fluid disperser 10 according to the present embodiment further includes the fourth wall portion 18 having the inner surface 18a provided on the second surface 12b and intersecting with the line LN extending from the middle region to the circumferential edge of the second surface 12b.

The outer diameter of the fourth wall portion 18 is smaller than the inner diameter of each of the second wall portion 14 and the third wall portion 16.

The fluid disperser 10 according to the present embodiment including the plural wall portions such as the fourth wall portion 18 in addition to the third wall portion 16 on the second surface 12b, can regulate the flow of the fluid passing through the holes 12c with higher accuracy. The outer diameter of the fourth wall portion 18 is preferably set to be smaller than the inner diameter of each of the second wall portion 14 and the third wall portion 16. Some of the reaction fluid R5 flowing into the second space S2 (refer to FIG. 1) and further flowing toward the outer circumferential side can be regulated along the inner surface 16a of the third wall portion 16, and the rest of the reaction fluid R5 flowing toward the inner circumferential side can be regulated along the outer surface 18b of the fourth wall portion 18. The reaction fluid R5 is thus to flow toward the perforated plate 150 approximately straight, so as to facilitate the regulation of the flow by the perforated plate 150 more efficiently.

The fluid dispersing device 120 according to the present embodiment includes the tubular-shaped portion 140 having the inner curved surface 140c having a greater channel diameter on the downstream side than on the upstream side, the opening portion 140a leading the fluid to flow into the channel, and the fluid disperser 10 installed in the channel. The first wall portion 12d of the fluid disperser 10 is opposed to the opening of the opening portion 140a. The second wall portion 14 of the fluid disperser 10 protrudes toward the inner curved wall 140c.

The fluid dispersing device 120 according to the present embodiment uses the fluid disperser 10 enabling the improvement in dispersion performance of the fluid, so as to contribute to the equalization of the fluid velocity distribution and the improvement in dispersion balance of the fluid discharged from the fluid dispersing device 120. The fluid disperser 10 is installed in the channel of the tubular-shaped portion 140 such that the first wall portion 12d is opposed to the opening of the opening portion 140a, and the second wall portion 14 protrudes toward the inner curved surface 140c, so as to achieve the effects described above more effectively.

The fluid dispersing device 120 according to the present embodiment includes the perforated plate 150 provided with the plural holes 150a allowing the fluid to flow in from the upstream side to the downstream side. The perforated plate 150 is installed parallel to the plate body 12 of the fluid disperser 10 on the downstream side of the fluid disperser 10 in the channel of the tubular-shaped portion 140.

The fluid dispersing device 120 according to the present embodiment including the fluid disperser 10 and further the perforated plate 150 installed on the downstream side of the fluid disperser 10 can achieve the equalization of the fluid velocity distribution and the improvement in dispersion balance of the fluid discharged from the fluid dispersing device 120 more effectively.

Figure 5:
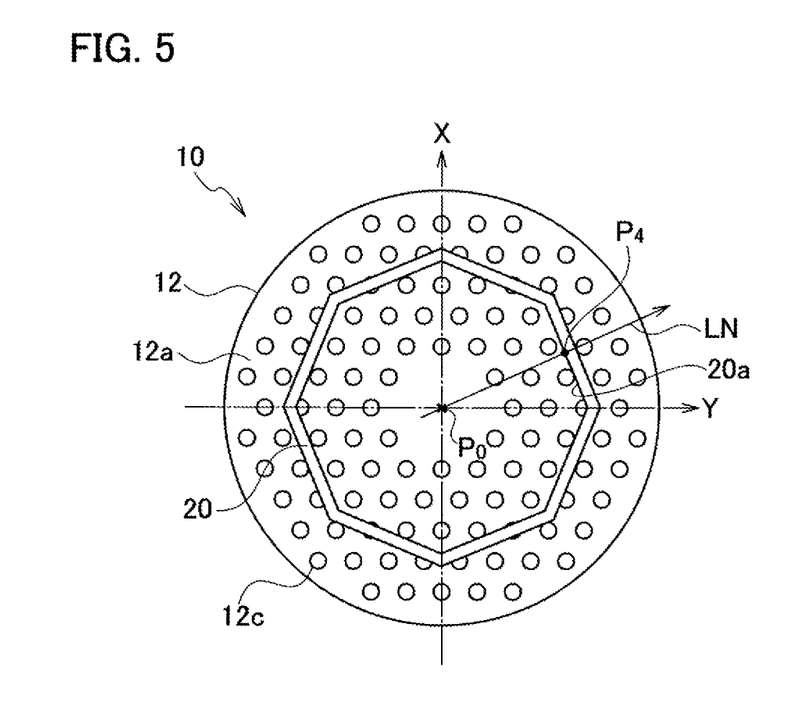
FIG. 5 is a view showing a configuration of a fluid disperser according to another embodiment of the present disclosure.

The present disclosure has been illustrated with the case in which the second wall portion 14 has a hoop shape, in particular a round shape in cross section, but is not limited to this case. For example, as shown in FIG. 5, a fifth wall portion 20 corresponding to the second wall portion 14 may have a polygonal shape in cross section including a plurality of straight inner surfaces 20a connected together so as to be formed into a hoop shape, instead of a round shape. Since the fifth wall portion 20 has the respective inner surfaces 20a also intersecting with the line LN extending from the middle region to the circumferential edge of the first surface 12a at the intersection point $P_4$, the fluid disperser 10 can also achieve the above effects accordingly.

While the second wall portion 14 is illustrated with the case of having a hoop shape in cross section, the term "hoop shape" is not intended to be limited to a completely hoop shape. For example, the second wall portion 14 may have any shape divided in some parts, but presumed to entirely have a hoop shape so as to achieve the above effects in the same manner.

It should be understood that the present disclosure includes various embodiments which are not disclosed herein. Therefore, the scope of the present disclosure is defined only by the matters according to the claims reasonably derived from the description above.

What is claimed is:

1. A fluid dispersing device comprising:
    a tubular-shaped portion having an inner curved surface with a channel having a greater diameter on a downstream side than on an upstream side;
    an opening portion provided in the tubular-shaped portion and allowing a fluid to flow into the channel; and
    a fluid disperser installed in the channel, the fluid disperser comprising:
        a plate body having a first wall portion in a middle region of a first surface of the plate body, the plate body facing the upstream side of the channel and including the middle region as one main plane surface, and the plate body provided with a plurality of holes around the first wall portion allowing a fluid to flow in from the upstream side to the downstream side of the channel; and
        a second wall portion provided on and protruding from the first surface and having an inner surface intersecting with a line extending from the middle region to a circumferential edge of the first surface;
    wherein
        the first wall portion of the fluid disperser is opposed to an opening of the opening portion,
        the second wall portion of the fluid disperser protrudes toward the inner curved surface, and
        a height of the second wall portion of the fluid disperser is smaller than an opening diameter of the respective holes provided in the plate body.

2. The fluid dispersing device according to claim 1, further comprising a perforated plate provided with a plurality of holes allowing the fluid to flow in from the upstream side to the downstream side, the perforated plate being installed parallel to the plate body of the fluid disperser on the downstream side of the fluid disperser in the channel.

* * * * *